Jan. 30, 1951    A. KOST    2,539,436
MIXER

Filed Oct. 12, 1946    2 Sheets-Sheet 1

INVENTOR
*Alwin Kost*
BY
*Fred C. Matheny*
ATTORNEY

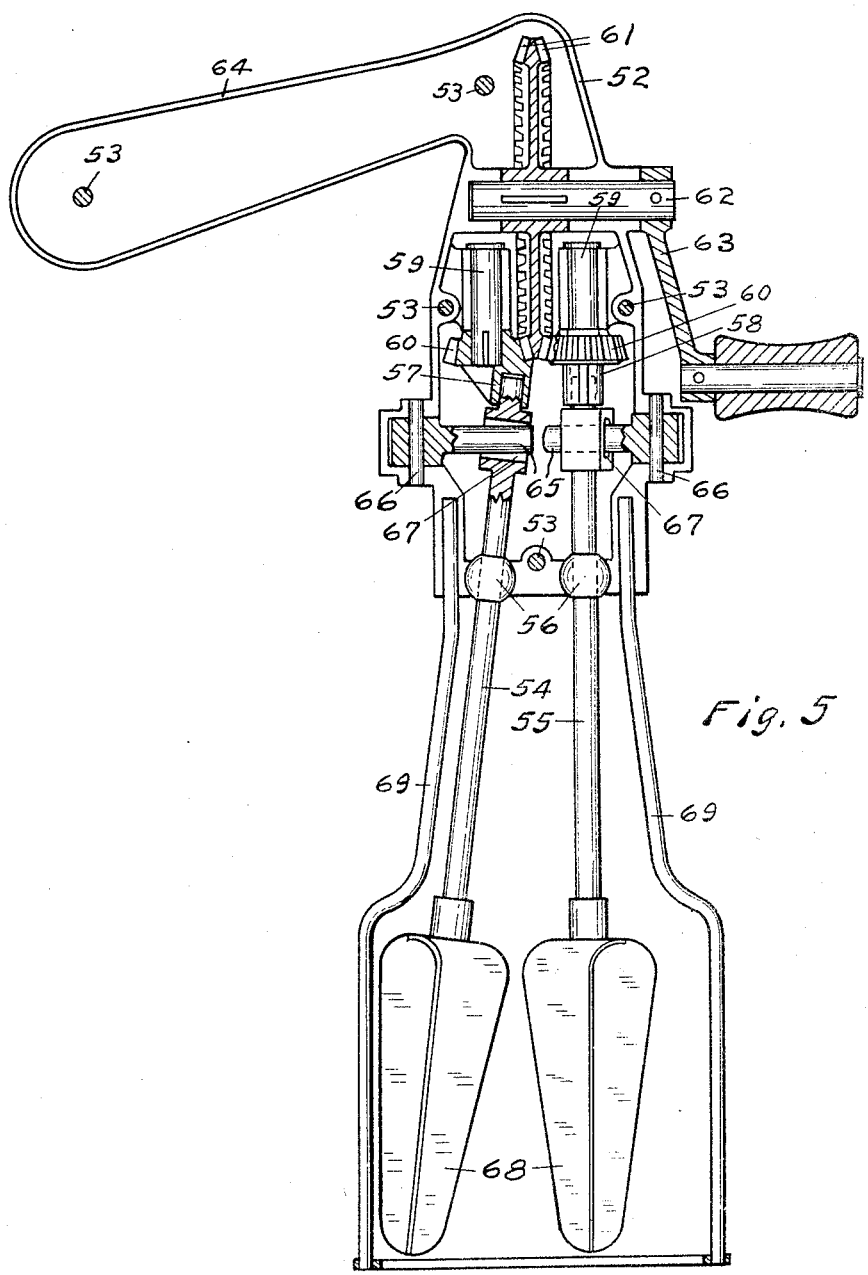

Patented Jan. 30, 1951

2,539,436

UNITED STATES PATENT OFFICE 2,539,436

MIXER

Alwin Kost, Portland, Oreg.

Application October 12, 1946, Serial No. 703,008

2 Claims. (Cl. 259—129)

This invention relates to a mixer of a type in which a movable mixing member is disposed within a liquid or plastic substance that is to be thoroughly mixed.

My present invention is, in some respects, an improvement on devices disclosed in my prior patent on a mechanical movement No. 2,246,689, issued June 24, 1941.

An object of this invention is to provide a mixer that is particularly well adapted for use in the home and in places where foods and drinks are to be mixed.

Another object of this invention is to provide a mixer that is highly efficient in operation and one that will save time and labor in the mixing of liquid, semi-liquid or plastic foods, drinks and the like.

Another object is to provide a mixer that is well adapted for either hand operation or motor operation.

Another object is to provide a mixer that is simple and durable in construction, not expensive to manufacture and very fast in the mixing of liquid and semi-liquid foods and like substances.

Another object is to provide a mixer having a mixing member provided with a mixing member adapted to be moved in a conical path in material to be mixed, said mixing member being further adapted to be simultaneously moved on its own axis to produce a complex three dimensional movement that is highly efficient in mixing foods, drinks and like materials.

Other objects of the invention will be apparent from the following description taken in connection with the accompanying drawings.

In the drawings:

Fig. 5 is a view partly in vertical mid section and partly in elevation, and with one half of the housing removed, showing a modified form of this mixer which has two mixing blades.

Like reference numerals designate like parts throughout the several views.

Figure 1:
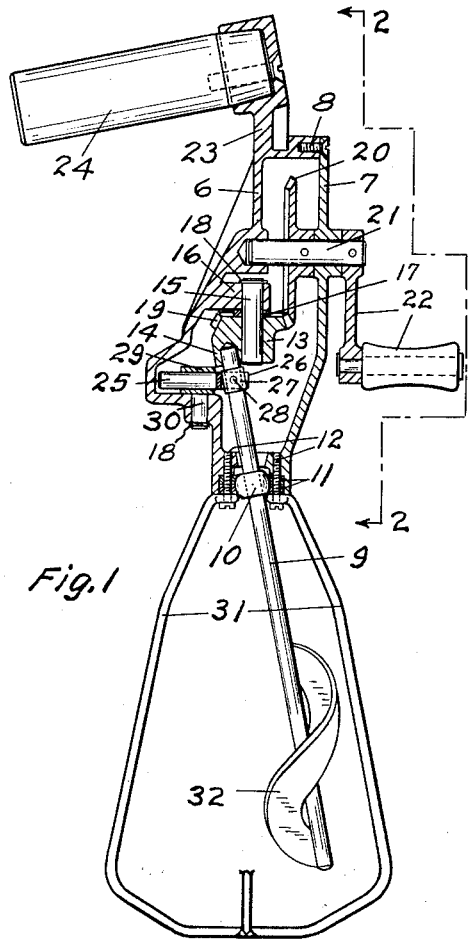
Figure 1 is a view in vertical cross section with parts in elevation of a portable manually operated mixer constructed in accordance with this invention.
Figure 2:
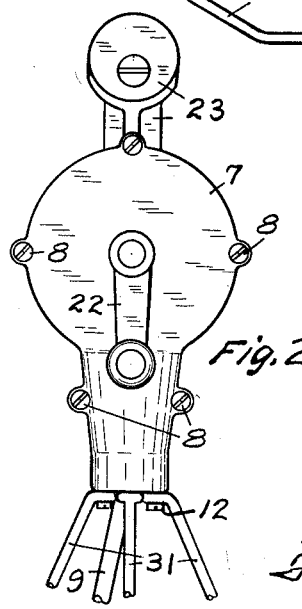
Fig. 2 is a view in elevation of the mixer looking in the direction of broken line 2—2 of Fig. 1, parts being broken away.

Figs. 1 and 2 show a housing formed of two parts 6 and 7 secured together, as by screws 8, a mixer shaft 9 extends through the bottom of the housing and is positioned partly within said housing and partly on the outside thereof. The mixer shaft 9 has a ball 10 fixedly secured on it. The ball 10 is journaled for universal movement in a bearing formed by two bearing washers 11 that are secured in the bottom portion of the housing 6, 7 by screws 12. The ball 10 thus serves as a pivotal bearing by which the shaft 9 is mounted for universal pivotal movement.

Means is provided for imparting movement to the mixer shaft 9 in conical paths. This means comprises a crank member 13 having a socket 14 within which the upper end portion of the shaft 9 is rotatively received. The crank member 13 is mounted on an upright shaft 15 that is supported in a housing bracket 16. Preferably a washer 17 is provided between the crank member 13 and the housing bracket 16. A snap ring 18 may be provided on the shaft 15 above the housing bracket 16 as a fastening means.

The crank member 13 carries a bevel gear 19 that meshes with another bevel gear 20. The bevel gear 20 is secured to a shaft 21 that is journaled in the two housing parts 6 and 7. The shaft 21 is provided, outside of the housing, with a crank handle 22 by which it can be manually turned.

The housing part 6 has an upwardly extending handle bracket 23 to which a handle member 24 is fixedly secured. Preferably the handle 24 is inclined downwardly as shown. This inclined position has been found to be a convenient position for the handle of a mixer that is normally operated substantially vertically.

Rotation of the crank member 13 will impart movement to the shaft 9 in two conical paths that have their apices at the center of the ball 10. In addition to this conical movement I have provided means for simultaneously imparting an oscillating movement to the shaft 9 on its own axis. This shaft oscillating means comprises a piston member 25 having at one end a forked bracket 26 that fits over a sleeve 27 on the shaft 9. A pin 28 extends crosswise through the bracket 26 and sleeve 27 and shaft 9. Thus the piston member 25 can be used to control oscillating movement of the shaft 9 on its own axis.

The piston member 25 is slidably disposed in a tubular mounting member 29. The member 29 has a rigidly connected pivot pin 30 extending at right angles therefrom. The pivot pin 30 is journaled in the housing member 6 for oscillation on an axis that is positioned at right angles to the piston member 25 and parallel to the common axis of the conical paths in which the shaft 9 is moved by the crank member 13. Snap ring means 18 at the bottom end of pin 30 prevents upward displacement of pin 30 in housing 6.

A guard member 31, of relatively open construction and which may be formed of wire is provided around the downwardly protruding end portion of the shaft 9 and is secured to the housing 6, 7. The screws 12 can be used as a fastening means for the guard member 31.

A mixing blade 32 of any suitable shape and construction is secured to the lower end portion of the shaft 9. The mixing blade 32 can be formed of flat metal extending spirally around the shaft 9 and rigidly secured thereto. Such a blade has been found to operate efficiently in the mixing of liquid or semi-liquid substances.

In the operation of the mixer shown in Figs. 1 and 2 the lower end portion of the device is positioned within a receptacle which contains a liquid or semi-liquid to be mixed. The operator preferably holds the handle 24 in one hand and presses the guard member 31 down against the bottom of the receptacle and turns the crank 22 with the other hand. Turning of the crank 22 operates through the bevel gears 19 and 20 to rotate the crank member 13 and move the mixing shaft 9 in a double conical path. As the mixing shaft 9 is thus moved the shaft oscillating mechanism comprising parts 25 to 30 inclusive imparts oscillation to the shaft 9 on its own axis. These two movements simultaneously imparted to the shaft 9 which carries the spiral mixing blade 32 have been found to be highly efficient in the mixing of liquid and plastic materials. The conical movement of the mixer shaft continuously stirs the liquid or semi-liquid and the oscillating movement of the mixer shaft intermittently applies a back slap that results in very rapid and thorough mixing.

Figure 3:
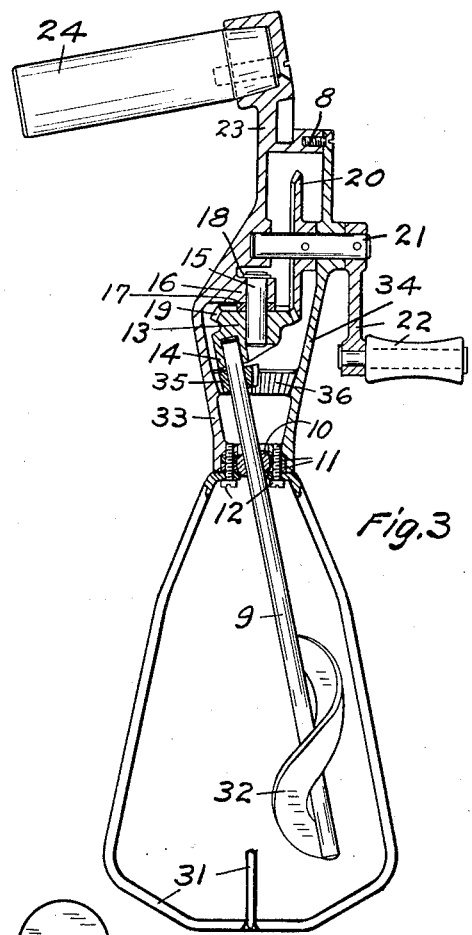
Fig. 3 is a view similar to Fig. 1, showing a modified form of manually operated mixer.

The mixer shown in Fig. 3 is similar to the mixer shown in Figs. 1 and 2 except that, in the device of Fig. 3, the oscillating devices shown in Figs. 1 and 2 are dispensed with and in place thereof means are provided for imparting continuous rotation to the mixing shaft in a direction opposite to the direction of conical movement of said shaft. Parts in Fig. 3 which are similar to parts in Figs. 1 and 2 are similarly numbered.

The housing in Fig. 3 is made up of two parts 33 and 34 which are slightly different in shape from the housing parts 6 and 7 shown in Figs. 1 and 2 but are similar in purpose and function. The shaft 9 in Fig. 3 has a gear pinion 35 secured thereon. The two housing members 33 and 34 are internally toothed to provide a continuous internal gear 36. The pinion 35 meshes with this internal gear 36. As the shaft 9 in Fig. 3 is moved in a conical path the pinion 35 will be rotated by the internal gear 36 and will rotate said shaft 9 in a direction opposite to the direction in which said shaft 9 is being moved in a conical path. This imparts to the portion of the shaft that is used for mixing a highly efficient movement for mixing purposes.

Figure 4:
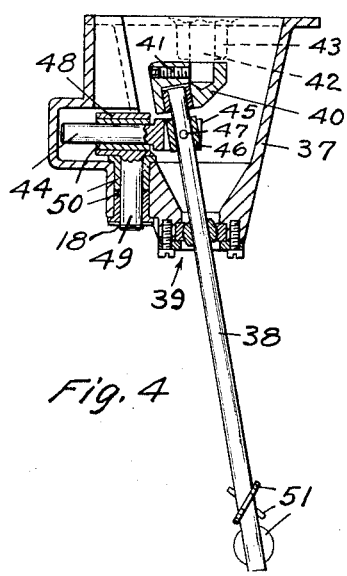
Fig. 4 is a vertical sectional view, with parts in elevation, of a modified form of this mixer that is adapted to be attached to a motor of the type ordinarily employed for the mixing of drinks in which ice cream is used.

In the adaptation of the invention shown in Fig. 4 the parts are similar in purpose and function to the parts shown in Figs. 1, 2 and 3 but are different in shape to adapt the device of Fig. 4 for use as an attachment to an electric motor. The device of Fig. 4 comprises a housing 37 carrying a mixer shaft 38 that is pivotally mounted in the bottom of said housing 37 by universal bearing means 39. The upper end portion of the mixer shaft 38 is connected with a crank member 40 that is similar to the crank member 13 except that it is fixedly connected, as by a set screw 41, with the driven shaft 42 of a motor 43, a fragment of the shaft 42 and motor 43 are shown by broken lines in Fig. 4.

Means for oscillating the mixer shaft 38 while said shaft is being moved in a conical path is provided. This means comprises a piston member 44 having a forked end 45 that fits over a sleeve 46 on the shaft 38 and is connected therewith by a pin 47. The piston member 44 is slidably disposed in a tubular guide member 48. The guide member 48 is pivotally connected with the housing 37 by an upright mounting pin 49. Snap ring means 18 at the bottom end of pin 49 prevents upward displacement of pin in housing 37. Preferably bushings 50 are provided around the piston member 44 and pin 49. Suitable mixing blade means 51 is provided on the lower end portion of the mixer shaft 38.

The mixer shown in Fig. 4 operates in substantially the same manner as the mixer shown in Figs. 1 and 2 except that it is motor driven and is supported entirely from the motor.

The mixer shown in Fig. 5 comprises a housing 52 preferably formed of two parts. The plane of section of Fig. 5 coincides with the plane of separation of the two housing parts. For this reason the housing 52 is not shown in cross section in Fig. 5. Screws or rivets 53 secure the two parts of the housing 52 together in assembled relation.

Two mixer shafts 54 and 55 extend through spaced apart balls 56 that are secured within the bottom portion of the housing 52. The balls 56 thus support the two shafts 54 and 55 for movement in conical paths. The upper end portions of the two shafts 54 and 55 are seated in crank members 57 and 58 respectively. The crank members 57 and 58 are mounted on shafts 59 and have gears 60 rigid therewith that are disposed in mesh with the teeth of a double driving gear 61. The gear 61 is mounted on a shaft 62 and is operated by a crank handle 63.

A handle 64 is provided on the housing 52.

Devices are provided for imparting oscillation to each shaft 54 and 55 as these shafts are moved in conical paths by the crank members 57 and 58. Each shaft oscillating device comprises a pin member 65 swingingly connected with the housing 52 by a vertical pivot member 66 and extending through a slot 67 in one of the shafts 54 and 55. As the upper end portions of the shafts 54 and 55 follow conical paths the pin members 65 will impart oscillating rotary movement to said shafts on their own axes. This imparts a back slap to the mixer shafts 54 and 55 and produces a very rapid mixing of liquid or semi-liquid material.

Each shaft 54 and 55 carries mixing blade means 68 of any suitable form. Suitable guard means 69 is provided around the portions of the shafts 54 and 55 which carry the blades 68.

The shafts 54 and 55 move in opposite directions in their conical paths and the paths of movement of the blades 68 preferably overlap each other. The shafts 54 are offset as respects their movement in such a manner as to avoid interference of the blades 68. This can be accomplished by so positioning the crank members 57 and 58 relative to each other as to cause the blades 68 to follow one after the other through the overlapping portions of their paths of travel. In the two blade mixer shown in Fig. 5 the two mixing shafts 54 and 55 and the blades carried thereby will travel in opposite directions in their conical paths. However these two blades will be moving in the same general direction where their paths of movement overlap but they are offset as respects their timing so that they will travel one after the other through the overlapping portions of their paths of movement without interfering with each other. The two blades provide a highly efficient mixer that is fast in its mixing operation.

The foregoing description and accompanying drawings clearly disclose preferred embodiments of this invention but it will be understood that this disclosure is merely illustrative and that changes in the same can be made within the scope and spirit of the following claims.

I claim:

1. A mixer comprising a housing; a shaft extending through a wall of said housing; mixer blade means on said shaft external to said housing; a ball fixedly mounted on said shaft; bearing means in the bottom wall of said housing rotatively receiving said ball and supporting said shaft for rotary movement and for movement in conical paths and providing a seal in the wall of said housing around said shaft; a crank member in said housing rotatable on an axis that passes through the center of said ball bearing means; a socket on said crank member at one side of the axis of rotation of said crank member, said socket having the end portion of said shaft positioned therein whereby rotation of said crank member will move said shaft in conical paths; manually operated gear means to impart rotation to said crank member; and means disposed within the housing and connected with the shaft between said crank member and said ball and bearing means and operable to rotatively move said shaft on its axis while said shaft is being moved in a conical path.

2. A mixer comprising a housing; a shaft extending through a wall of said housing; mixer blade means on said shaft external to said housing; a ball fixedly mounted on said shaft at the location where said shaft passes through said housing wall; bearing means in said housing wall rotatively receiving said ball and rotatively supporting said shaft for movement in conical paths; a crank member in said housing rotatable on an axis that passes through the center of said ball; manually operated crank rotating means connected with said crank member; a socket on said crank member at one side of the axis of rotation of said crank member, said socket having the end portion of said shaft positioned therein whereby rotation of said crank member will move said shaft in conical paths; an internal gear in said housing between said crank member and said ball bearing; and a pinion on said shaft meshing with said internal gear to thereby rotate said shaft simultaneously with the conical movement thereof.

ALWIN KOST.

REFERENCES CITED

The following references are of record in the file of this patent:

UNITED STATES PATENTS

| Number | Name | Date |
|---|---|---|
| 1,137,037 | Warner | Apr. 27, 1915 |
| 1,438,281 | Westermann | Dec. 12, 1922 |
| 1,475,978 | Westermann | Dec. 7, 1923 |

FOREIGN PATENTS

| Number | Country | Date |
|---|---|---|
| 90,469 | Austria | Dec. 27, 1922 |
| 635,121 | Germany | Sept. 10, 1936 |
| 656,624 | France | May 10, 1929 |